United States Patent [19]

Limp, deceased

[11] Patent Number: 4,847,564
[45] Date of Patent: Jul. 11, 1989

[54] COLD-CATHODE IONIZATION VACUUM METER WITH AUXILIARY IGNITION SYSTEM FOR VERY LOW PRESSURE OPERATION

[75] Inventor: Hans Limp, deceased, late of Cologne, Fed. Rep. of Germany, Helga Limp, Harald Limp, Heirs

[73] Assignee: Keybold Aktiengesellschaft, Hanau, Fed. Rep. of Germany

[21] Appl. No.: 134,207

[22] Filed: Dec. 17, 1987

[30] Foreign Application Priority Data

Dec. 13, 1986 [DE] Fed. Rep. of Germany ....... 3642670

[51] Int. Cl.$^4$ .................. G01L 21/30; G01L 21/34
[52] U.S. Cl. .................... 324/460; 324/463; 313/603
[58] Field of Search ............ 324/460, 461, 462, 463; 313/595, 600, 603

[56] References Cited

U.S. PATENT DOCUMENTS

| | | | |
|---|---|---|---|
| 3,051,868 | 8/1962 | Red Head | 324/463 |
| 3,233,169 | 12/1962 | Asamaki | 324/460 |
| 3,449,660 | 6/1969 | Herb | 324/462 |
| 3,949,260 | 4/1976 | Bayless et al. | 313/603 |

FOREIGN PATENT DOCUMENTS 3047744  7/1982  Fed. Rep. of Germany ...... 324/460

*Primary Examiner*—Reinhard J. Eisenzopf
*Assistant Examiner*—Maura K. Regan
*Attorney, Agent, or Firm*—Kenyon & Kenyon

[57] ABSTRACT

A cold-cathode ionization or Penning vacuum meter with an ignition system to increase the meter's usefulness at very low pressures. The ignition system comprises an additional anode and at least one additional cathode mounted adjacent to the primary, measuring, cathode and anode and within the same magnetic field as the primary cathode and anode. The at least one additional cathode and the anode are substantially smaller than the measuring cathode and the anode and serve to ignite or start the ionization of the atmosphere whose pressure needs to be measured.

7 Claims, 1 Drawing Sheet

COLD-CATHODE IONIZATION VACUUM METER WITH AUXILIARY IGNITION SYSTEM FOR VERY LOW PRESSURE OPERATION

BACKGROUND OF THE INVENTION

1. Field of the Invention

The present invention relates to the field of pressure measuring instruments, particularly those instruments capable of accurately measuring very low gas pressures. More specifically it relates to the type of instrument known as a Penning or cold-cathode ionization vacuum meter.

2. Description of Prior Art

Cold-cathode ionization or Penning vacuum meters are known in the art. This type of vacuum meter operates on the principle that the rate of ion production by a stream of electrons in a vacuum system is dependent on the pressure and ionization probability of the residual gases. The meter is generally comprised of two cathodes arranged opposite one another with an anode centrally spaced between them, the cathodes and anode being mounted inside a metal envelope, the envelope being connected to the atmosphere being measured. Outside the envelope a permanent magnet provides a magnetic field to lengthen the path travelled by the electrons going from the cathode to anode, which increases the amount of ionization, allowing the meter to operate well at low pressures. The anode is normally set to a potential of 2 kV, with gives rise to a direct current caused by positive ions arriving at the cathode. The pressure is indicated directly by the magnitude of the current.

At very low pressures this type of vacuum meter frequently fails to operate properly as there is insufficient ionization in the residual gases for measurement operations to begin. Several methods have been used in attempts to correct this problem.

German patent DE-OS No. 30 47 744 uses an additional host cathode, in addition to the normal cold cathode and anode, to insure sufficient ionization in the residual atmosphere. This method requires the use of additional power sources, as the hot cathode must be provided with a large current.

Various other suggestions, such as a metal point in the discharge chamber or the use of ionizing radioactive materials in the chamber have been made. Either they did not lead to the desired results (the metal points), or they caused additional problems (radioactive materials, e.g.).

Consequently, there is still a need for some device or improvement to be used with a cold-cathode ionization vacuum meter which will insure reliable low pressure operations.

SUMMARY OF THE INVENTION

It is an object of this invention to provide a reliable igniter for a cold-cathode ionization vacuum meter which will insure reliable low pressure operation.

An additional object of this invention is to provide an igniter which can be easily mounted in existing meters, without requiring extensive modifications.

A further object of the invention is to have the igniter operate at the same potential levels as the measuring cathode and anode, thereby obviating the need for additional power supplies.

A still further object of the invention is to provide an igniter which is inexpensively fabricated but nonetheless reliable in operation.

Still other and further objects of the present invention will be apparent to those skilled in the art from the following description of the invention.

The above and other objects of the present invention are accomplished by placing a second, Penning-type system, called the ignition system, adjacent to the first cathode-anode measuring system. The dimensions of this second system are significantly smaller than those of the primary, measuring cathode-anode system. However, the cathode and anode of the ignition system are electrically connected to the measuring systems's cathode and anode and operate at the same potential levels. Consequently, the charge density is much greater in the ignition system. This insures adequate ionization to allow measuring operations at very low pressures.

For ease of design and manufacture the anodes of both the measuring and ignition system should be annular in shape and arranged so their axes are parallel. For proper operation, the diameter of the measuring system's anode should be roughly four times larger than the diameter of the ignition system's anode. It is particularly advantageous if the anode of the measuring system supports the anode of the ignition system.

BRIEF DESCRIPTION OF THE DRAWINGS

The advantages of the present invention will be seen more clearly when the following description of the preferred embodiment is read in conjunction with the drawings, wherein.

DETAILED DESCRIPTION OF THE PREFERRED EMBODIMENT

Figure 1:
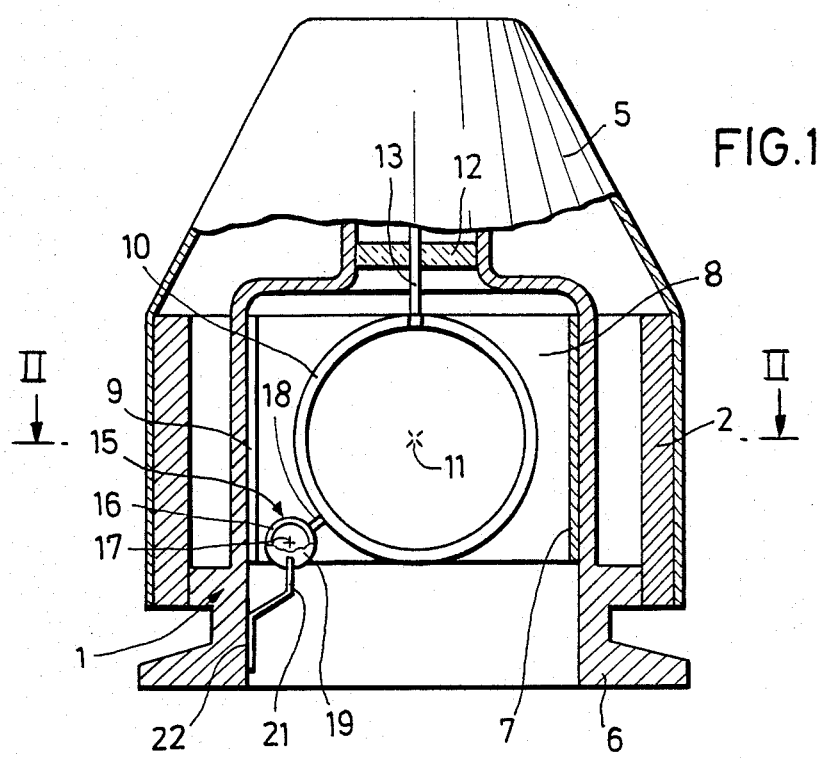
FIG. 1 is a partially cut-away cross-sectional view of the ionization vacuum meter.
Figure 2:
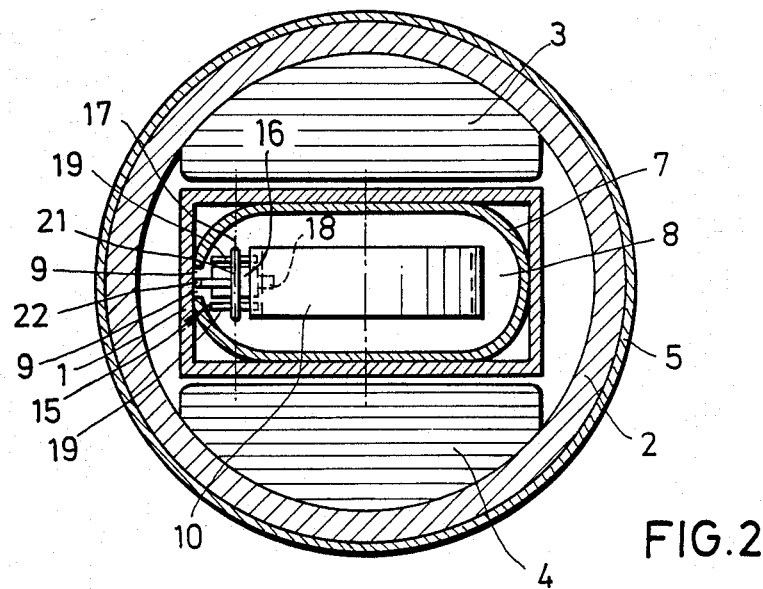
FIG. 2 is a cross-sectional view of the ionization vacuum meter along lines II—II of FIG. 1.

Referring now to FIGS. 1 and 2, a cylindrical steel casing 2 is provided. Magnets 3 and 4 are arcuate in form and are mounted on the inner surface of steel cylinder 2, directly opposite from one another. For the purposes of this description, magnet 3 will define the top of cylinder 2 and magnet 4 at the bottom. This orientation is purely arbitrary and has no functional purpose other than to make the ensuing description easier to understand. Further, the magnets are so arranged that the north pole of magnet 3 faces the south pole of magnet 4 across the interior volume of cylinder 2. Their polarity could be reversed without altering the operation of the meter. A protective cap 5 covers cylinder 2.

A vacuum-tight casing 1 is mounted with cylinder 2 between magnets 3 and 4. As seen in FIG. 2, the casing is roughly rectangular in form. The casing is equipped with flange 6 which is used to couple vacuum-tight casing 1 to the container or volume whose pressure is to be measured.

Replaceable cathode 7 is formed from a thin sheet of metal and is oblong in shape. Cathode 7 is placed within casing 1 and is in electrical contact with the casing. Although casing 1, being metallic, could perform the same function as cathode 7, in operation electrons are driven from cathode 7, which results in the deterioration and eventual disintegration of the cathode material. As cathode 7 is easily replaceable, this disintegration causes no severe operational difficulties. The shape and location of cathode 7 results in there being a small distance, on the order of several millimeters, between the faces of cathode 7. This small empty space is defined as electrode chamber 8. Cathode 7 is maintained at ground electrical potential.

Annular anode 10 is mounted in electrode chamber 8 in such a way as to be suspended between the faces of cathode 7, with axis 11 of anode 7 directed towards magnets 3 and 4. The mounting is accomplished by means of compression glass seal 12, located in the end of casing 1 which faces away from flange 6. Seal 12 is set in a small opening in casing 1. Anode feeder 13, which supplies anode 10 with positive high-voltage potential (approximately 2 kV), also goes through glass seal 12. Together, anode 10 and cathode 7 comprise the measurement system of the vacuum meter.

Ignition system 15 is also located within electrode chamber 8, between magnets 3 and 4. System 15 is comprised of annular anode 16, which has a much smaller diameter than anode 10, preferably about four times smaller. Anode 16 has a central axis 17 which is parallel to axis 11 of anode 10 and is also approximately one half the vertical length of anode 10. Metal pin 18 holds anode 16 to anode 10 and also maintains anode 16 at the same potential as anode 10.

Two circular metal disks 19 serve as the cathodes for ignition system 15. The disks have either the same diameter as anode 16 or a slightly larger diameter. Disks 19 are mounted so that one disk covers the top of anode 16 and the other covers the bottom. Neither disk touches anode 16 and metal fork-shaped mounting 21 maintains the disks' position and electromechanically connects the disks to casing 1, thereby establishing ground electrical potential on both disks. The connecting point is chosen so that the removal and replacement of cathode 7 is not hindered.

In operation, the small dimensions of ignition system 15, which has the same electrical potential as the measuring system, insures that there is sufficient charge per unit area to begin the necessary ionization within the meter, even at very low pressures. Once the ionization process begins, sufficient charge carriers immediately reach the measuring system for it to begin operation. Although not shown, the measuring system provides the pressure reading by means of a volt/current meter, which measures the amount of current flowing between the measurement system's cathode and anode and, by use of a calibrated scale, provides a direct pressure reading.

Although the ignition system of the present invention has been described in terms of specific embodiments, it will be apparent to those skilled in the art that many modifications are possible within the spirit and scope of the invention.

What is claimed is:

1. A cold-cathode ionization vacuum meter having a measuring system comprising a cathode of preset dimensions mounted in a vacuum-casing within a magnetic field of a permanent magnet, an annular anode mounted within the vacuum-casing and further within the cathode, and further comprising an auxiliary ignition system having a further anode and at least one further cathode, said further anode and cathode having no more than half the diameter of the anode and further wherein the anode of the measuring system and the further anode are electromechanically connected to one another.

2. The meter of claim 1, wherein the diameter of the anode of the measuring system is at least four times larger than the diameter of the further anode.

3. The meter of claim 2, wherein the height of the anode of the measuring system is at least twice the height of the further anode.

4. The meter of claim 1, wherein the ignition system has two cathodes which are mounted on a fork-shaped mounting means which is attached to the vacuum-casing.

5. The meter of claim 4, wherein the vacuum-casing is hollow and has a rectangular cross-section.

6. The meter of claim 5, wherein the measuring system and ignition system are mounted within the hollow rectangular cross-section of the vacuum casing with the forked-shaped mounting mounted on one of the narrow sides of the rectangular cross-section.

7. The meter of claim 1, wherein the diameter of the anode of the measuring system is 25 mm.

* * * * *